Patented Oct. 9, 1928.

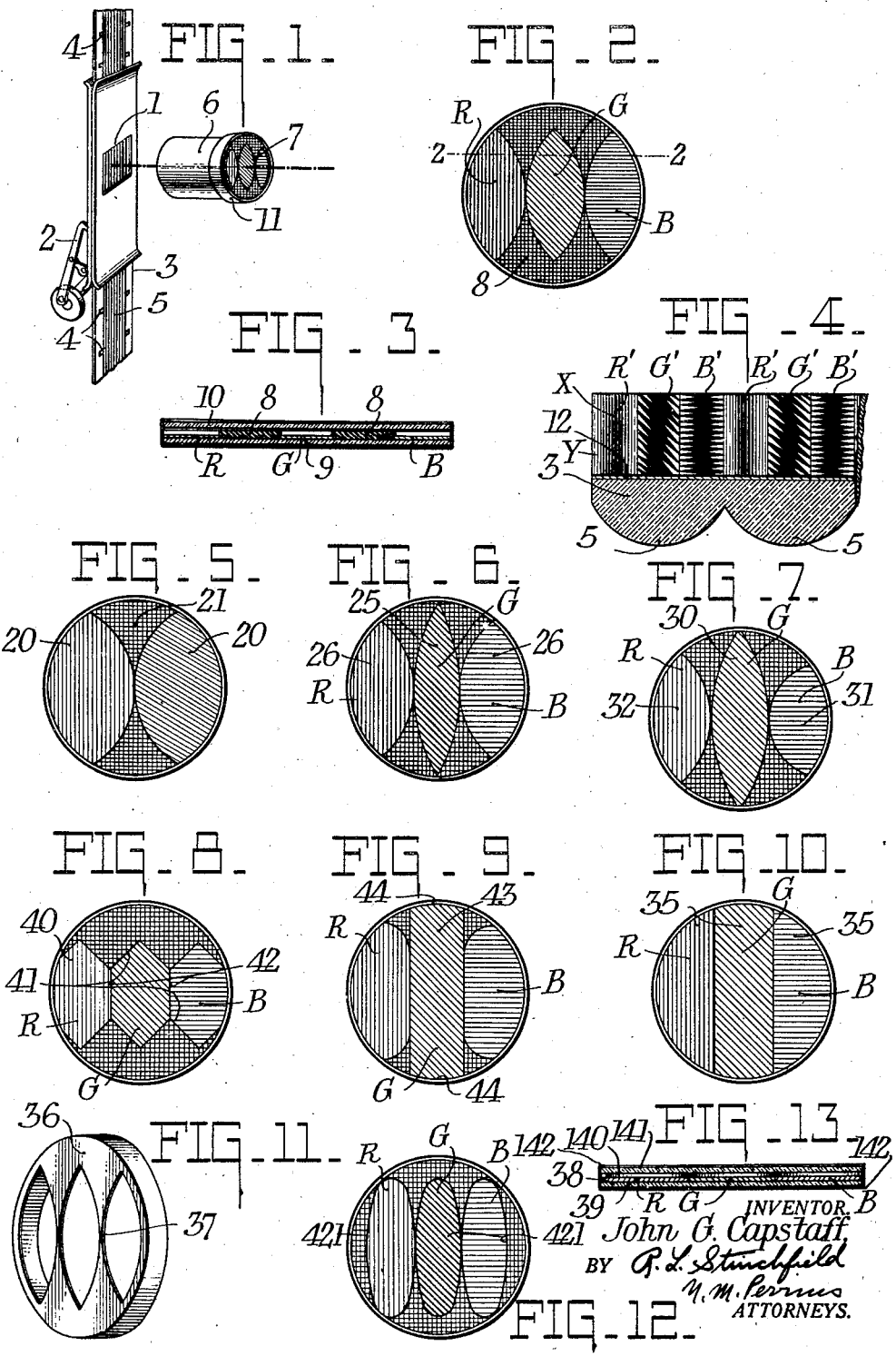

1,687,055

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

APPARATUS FOR PHOTOGRAPHIC COLOR PROCESS.

Application filed August 22, 1927. Serial No. 214,467.

This invention relates to color photography and more particularly to an improvement applicable to the process disclosed in the patent Berthon No. 992,151, granted May 16, 1911, and comprising the taking and projecting of images through a polychromatic screen by the use of a photographic support with minute lenses on one surface.

The objects of the present invention are to secure the maximum resolution of the color records in the film and, consequently, purer colors in the projected pictures, and to increase the range of exposures over which tone differences can be reproduced in a given film. These and other objects and advantages are attained by the use of an improved filter or screen having a series of color fields side by side with their ends tapered or rounded, particularly with films in which the lens elements are in the form of ridges extending parallel to the major axes of the color fields of the screen, as will be more fully understood from the following description, wherein reference is made to the accompanying drawing in which the same reference characters denote the same parts throughout and in which, Fig. 1 is a diagrammatic showing of a motion picture system embodying my invention.

Fig. 2 is a face view of one form of my improved screen.

Fig. 3 is a section on line 2—2 of Fig. 2.

Fig. 4 is a perspective view of a fragment of film showing the nature of the color images.

Figs. 5, 6, 7, 8 and 9 are face views of other forms of screens embodying my invention.

Fig. 10 is a view of a screen adapted to be used with a special mask.

Fig. 11 is a perspective view of a cap to be used with the screen of Fig. 10.

Fig. 12 is a face view of still another screen.

Fig. 13 is a section of a screen showing a structure somewhat different from Fig. 3.

In Fig. 1 there is shown in a diagrammatic way a motion picture gate 1 past which is drawn by a pulldown mechanism indicated conventionally at 2 a sensitized film 3, having perforations 4, and microscopic longitudinal ridges or semi-cylinders 5 on that surface facing an objective in a mount 6 associated with which, and here shown as in front, is a polychromatic screen 7 carried by a suitable cap 11.

The screen in the preferred form has three color fields, which, in an ideal case are of identical shape and dimensions as shown in Fig. 2 where the diaphragm 7 has three fields R, G and B transmitting red, green and blue respectively. They are tangent to one another, at their central or widest point, or as nearly so as is consistent with the tenuity of the opaque mask 8 separating the colored areas. In practice, the screen may be made by placing pieces of appropriately shaped and colored gelatine on a glass or pyroxylin disc or plate 9, placing on this an opaque mask of the required form and placing on this a second disc 10, a section with magnified thickness of such a screen being shown in Fig. 3. The mask may be of opaque varnish or pigmented gelatine, or of any other suitable material.

The width of the whole screen will, of course, be such as is required in the particular optical system used, being generally the same as the diaphragm opening of the objective, so that the image formed on the emulsion by each cylindrical element will exactly fill the space behind each element. Then the image of a white object will consist of a series of minute bands of equal width, one third the width of a ridge or cylindrical element, these bands as projected being colored in sequence to correspond to the screen. Each band will be brightest at its center and diminish in intensity to its edges. Since the portions of the maximum brightness of the bands are their central lines, which are evenly spaced, the irradiation of color from one band to another is reduced to a minimum and the optimum conditions for resolution of the color records will be fulfilled.

In Fig. 4 is shown, on a very much magnified scale, a fragment of film 3 showing the image bands R', G', B' as thus projected in a camera on the emulsion layer 12. In the several bands shown the illumination is most intense in the center and three of them are seen to fall opposite the cylindrical lens 5 by which they are formed.

It is obvious that if the exposure is just sufficient to produce a maximum effect in the central portion of the image of a band, say at the point X of the red component band, it will not produce at a point Y lying near the edge of the band an exposure sufficient to produce a maximum effect. Further increase in exposure will have the effect, therefore, of widening the portion X of complete exposure or developability of the image. This increases the range and quality of tone reproduction.

If only two colors are used, the screen may appear as in Fig. 5 with two similarly shaped fields 20 colored red and blue-green respectively with a mask 21 over the remaining area.

The dimensions of the several fields may vary one from another, the area remaining the same, as in Fig. 6, where the central area 25 is longer but narrower than the side areas 26 but their areas are the same.

Where, for instance, the sensitivity of the film is consistently lower for one color than for the others, one color field may have a larger area than the others, as in Fig. 7 where the fields have the same width, but the green field 30 is the longest and the blue field 31 the shortest, the red field 32 being of intermediate length.

In Fig. 8 the fields 40 are shown as having straight edges 41 at their ends and straight separating lines 42 and in Fig. 9 the central field 43 utilizes the curved edges 44 of the circular screen as its ends, but in every case each field has its greatest length at its center and produces the desired effect to a greater or less extent as the height of the field varies from center to edge. Fig. 9 is particularly efficient in using a large proportion of the total area of the screen, but the effect in the central field is smaller than in the other described forms.

The openings in any particular case will be designated to meet the requirements of the system, such as the sensitivity of the film, the nature of the light source, the transmission characteristics of the camera and projector and the like, and may vary widely in area, dimensions, relative size, and form as found most efficient.

It is to be noted that images taken by means of a screen of a certain design need not be projected through a screen of identical design, as long as the widths of the fields correspond in the two screens, and the transmissions of the several fields of the projection filter are suitable for the light source and the film.

Another embodiment of my invention is particularly applicable if the color ratio of the emulsion varies noticeably or if emulsions of different types are to be used. A screen such as is shown in Fig. 10 may be used, having color fields 35 of equal width. There would be furnished for use with this, caps such as 36, Fig. 11, made of metal or opaque paper and adapted to be slipped over the screen and united with it. The cap 36 and screen 35 together would then constitute a screen having the characteristics of my invention. Similar elements could be permanently united in the manner of the screen shown in section in Fig. 13, which is similar to Fig. 3. A screen 38 similar in form to that shown in Fig. 10 and preferably comprising a series of suitably colored gelatine bands is placed on a glass protective plate 39 and a mask 140 of desired shape and material placed upon it, a second protective sheet or plate 141 being then mounted on this. An edge binding 142 may be added.

In Fig. 12 is shown a screen the bands 421 of which are elliptical in shape.

It is obvious that numerous embodiments are possible and I contemplate as included within the scope of my invention all such modifications and equivalents as fall within the appended claims.

Having thus described my invention, that I claim as new and desire to secure by Letters Patent is:

1. A polychromatic screen for use in a color process utilizing a photographic element having associated therewith numerous image-forming elements and comprising a series of light transmitting areas of different color side by side, each area varying in length from side to side and its middle portion being the longest.

2. A polychromatic screen for use in a color process utilizing a photographic element having associated therewith numerous image forming elements and comprising a series of differently colored, light transmitting areas side by side, each area varying in length from side to side and being longest at its middle portion, the lines of greatest length in the several areas being parallel.

3. A polychromatic screen for use in a color process utilizing a photographic element having associated therewith numerous image-forming elements and comprising a series of light transmitting, differently colored areas, side by side, each area tapering toward its ends from each of its sides.

4. A polychromatic screen for use in a color process utilizing a photographic element having associated therewith numerous image-forming elements and comprising a series of light transmitting, differently colored areas, side by side, each area tapering toward its ends from each of its sides, and the areas being of equal width at their widest points.

5. In combination, an objective, a polychromatic screen associated with said objective and a photographic element in the rear focal plane of the objective, the photographic element comprising an image layer and a series of microscopic, lineal, parallel, image-forming elements between the layer and the objective and the screen comprising a series of light transmitting areas of different color, side by side, each area varying in height from side to side and longest at its middle portion, the lines of greatest length in the several areas being parallel to one another and to the said lineal elements.

6. In combination, an objective, a polychromatic screen associated with said objective and a photographic element in the rear focal plane of the objective, the photographic element comprising an image layer and a series of microscopic, lineal, parallel, image-forming elements between the layer and the objective and the screen comprising a series of light transmitting differently colored areas side by side, each area tapering towards its ends from each of its sides, and the lines of greatest length in the several areas being parallel to one another and to the said lineal elements.

7. In combination, an objective, a polychromatic screen associated with said objective and a photographic element in the rear focal plane of the objective, the photographic element comprising an image layer and a series of microscopic, lineal, parallel, image-forming elements between the layer and the objective and the screen comprising a series of light transmitting, differently colored areas side by side, each area tapering towards its ends from each of its sides, and the lines of greatest length in the several areas being parallel to one another and to the said lineal elements and the areas being of equal width at their widest points.

Signed at Rochester New York this 17th day of August 1927.

JOHN G. CAPSTAFF.